(12) United States Patent
Matsuyama et al.

(10) Patent No.: US 10,843,595 B2
(45) Date of Patent: *Nov. 24, 2020

(54) VEHICLE SEAT

(71) Applicant: TOYOTA BOSHOKU KABUSHIKI KAISHA, Aichi-ken (JP)

(72) Inventors: Nori Matsuyama, Aichi-ken (JP); Atsushi Shibata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,903

(22) Filed: May 20, 2019

(65) Prior Publication Data

US 2019/0351789 A1 Nov. 21, 2019

(30) Foreign Application Priority Data

May 21, 2018 (JP) .................. 2018-096922

(51) Int. Cl.
| | |
|---|---|
| *B60N 2/00* | (2006.01) |
| *B60N 2/02* | (2006.01) |
| *B60N 2/06* | (2006.01) |
| *B60N 2/20* | (2006.01) |
| *B60N 2/30* | (2006.01) |
| *B60N 2/68* | (2006.01) |
| *B60N 2/10* | (2006.01) |
| *B60N 2/005* | (2006.01) |

(52) U.S. Cl.
CPC ............. *B60N 2/10* (2013.01); *B60N 2/3047* (2013.01); *B60N 2/68* (2013.01); *B60N 2002/0055* (2013.01)

(58) Field of Classification Search
CPC .......... B60N 2/10; B60N 2/68; B60N 2/3047; B60N 2002/0055
USPC ....................................................... 297/331
See application file for complete search history.

(56) References Cited

U.S. PATENT DOCUMENTS 5,156,437 A * 10/1992 Hayakawa ............. B60N 2/071
297/335
5,156,438 A * 10/1992 Hayakawa ............. B60N 2/071
297/335

(Continued)

FOREIGN PATENT DOCUMENTS

JP 2017-210139 11/2017

*Primary Examiner* — Rodney B White
(74) *Attorney, Agent, or Firm* — Greenblum & Bernstein, P.L.C.

(57) ABSTRACT

A vehicle seat including, a seat cushion including: a pair of left and right base members; a seat cushion movable portion attached in a manner that enables tip-up around a rotation shaft disposed between the base members; and a seat cushion fixed portion fixed in a manner that an upper surface portion of at least one of the base members is partially overlapped with the seat cushion fixed portion, and a distance between the base members is smaller than a sum of widths of a rear end portion of the seat cushion movable portion and a rear end portion of the seat cushion fixed portion, and the seat cushion movable portion selectively adopts a normal state where the seat cushion movable portion forms a seating surface together with the seat cushion fixed portion, and a tip-up state without interfering with the seat cushion fixed portion.

9 Claims, 8 Drawing Sheets

(56) References Cited

U.S. PATENT DOCUMENTS

| | | | | |
|---|---|---|---|---|
| 5,158,338 A * | 10/1992 | Hayakawa | B60N 2/01591 | |
| | | | 297/335 | |
| 5,195,802 A * | 3/1993 | Hayakawa | B60N 2/366 | |
| | | | 297/334 | |
| 5,800,015 A * | 9/1998 | Tsuchiya | B60N 2/0715 | |
| | | | 297/331 X | |
| 6,012,771 A * | 1/2000 | Shea | B60N 2/36 | |
| | | | 296/65.05 | |
| 6,474,741 B2 * | 11/2002 | Kamida | B60N 2/91 | |
| | | | 297/378.12 | |
| 6,767,061 B2 * | 7/2004 | Ogino | B60N 2/1839 | |
| | | | 297/331 X | |
| 6,883,868 B2 * | 4/2005 | Yoshida | B60N 2/065 | |
| | | | 297/331 | |
| 6,935,691 B1 * | 8/2005 | Sasaki | B60N 2/0812 | |
| | | | 297/331 X | |
| 7,252,318 B2 * | 8/2007 | Sumida | B60N 2/01 | |
| | | | 296/64 | |
| 7,374,242 B2 * | 5/2008 | Champ | B60N 2/3031 | |
| | | | 297/331 X | |
| 7,712,829 B2 * | 5/2010 | Park | B60N 2/01 | |
| | | | 296/65.13 | |
| 7,780,234 B2 * | 8/2010 | Grable | B60N 2/305 | |
| | | | 297/331 X | |
| 7,914,077 B2 * | 3/2011 | Linkner | B60N 2/01583 | |
| | | | 297/331 X | |
| 8,157,315 B2 * | 4/2012 | Lindsay | B60N 2/12 | |
| | | | 296/65.05 | |
| 8,182,015 B2 * | 5/2012 | Muck | B60N 2/01583 | |
| | | | 296/65.03 X | |
| 8,376,442 B1 * | 2/2013 | Brantley | B60N 2/24 | |
| | | | 296/65.09 | |
| 8,444,223 B2 * | 5/2013 | Moegling | B60N 2/3013 | |
| | | | 297/331 X | |
| 8,459,748 B2 * | 6/2013 | Jovicevic | B60N 2/12 | |
| | | | 297/331 X | |
| 8,573,674 B2 * | 11/2013 | Otsuka | B60N 2/305 | |
| | | | 297/331 X | |
| 8,646,840 B2 * | 2/2014 | Stojanovic | B60N 2/26 | |
| | | | 297/331 X | |
| 9,649,956 B2 * | 5/2017 | Lehmann | B60N 2/065 | |
| 9,855,865 B2 * | 1/2018 | Supernavage | B60N 2/07 | |
| 10,336,220 B2 * | 7/2019 | Sera | B60N 2/242 | |
| 10,434,919 B2 * | 10/2019 | Kimura | B60N 2/686 | |
| 10,604,036 B2 * | 3/2020 | Kimura | B60N 2/12 | |
| 2017/0341543 A1 * | 11/2017 | Fujisawa | B60N 2/3011 | |
| 2018/0339628 A1 * | 11/2018 | Kimura | B60N 2/3047 | |
| 2019/0351788 A1 * | 11/2019 | Kimura | B60N 2/995 | |

* cited by examiner

VEHICLE SEAT

CROSS-REFERENCE TO RELATED APPLICATIONS

This application claims priority from Japanese Patent Application No. 2018-096922 filed on May 21, 2018, the entire contents of which are incorporated herein by reference.

TECHNICAL FIELD

The present disclosure relates to a vehicle seat.

BACKGROUND

A vehicle seat that includes a seat cushion that can be tipped up via a rotation shaft and is supported with respect to a base provided on a floor of a vehicle is known. In an automobile seat disclosed in JP-A-2017-210139, a base is attached to a slide rail which is assembled to a floor of a vehicle and extends in a seat front-rear direction, and a substantially central portion of a seat cushion in the front-rear direction is supported on the base by a rotation shaft.

In the automobile seat disclosed in JP-A-2017-210139, the slide rail is disposed below two end portions of the seat cushion in a seat width direction. Therefore, although the substantially central portion of the seat cushion in the front-rear direction is supported on the base by the rotation shaft, a rear end portion side of the seat cushion does not interfere with the base attached to the slide rail when a front side of the seat cushion is tipped up. However, when the slide rail is disposed on the floor of the vehicle, there is a case that the slide rail cannot be disposed below the two end portions of the seat cushion in the seat width direction and slide rail may have to be disposed at a position closer to an inner side in the seat width direction from at least one of the end portions of the seat cushion in the seat width direction. For example, the slide rail may have to be disposed on a floor near a tire house. At this time, in order to secure foot space of a rear seat occupant, the rotation shaft of the seat cushion with respect to the base is disposed substantially in the central portion of the seat cushion in the front-rear direction, and the rear end portion side of the seat cushion may interfere with the base when the seat cushion is tipped up.

SUMMARY

In view of such a problem, an object of the present disclosure is to provide a vehicle seat in which a seat cushion does not interfere with a base member when the seat cushion is tipped up, even if the base member is disposed on seat inner sides below two end portions of the seat cushion in a seat width direction.

An aspect of the present disclosure is a vehicle seat including, a seat cushion including: a pair of left and right base members extending in a seat front-rear direction and supported by a vehicle floor; a seat cushion movable portion which is attached in a manner that enables tip-up around a rotation shaft, the rotation shaft being disposed between the pair of the left and right base members and extending in a left-right direction; and a seat cushion fixed portion which is fixed in a manner that an upper surface portion of at least one of the pair of the left and right base members, which is located behind the rotation shaft, is partially overlapped with the seat cushion fixed portion when viewed from above, and a distance between the pair of the left and right base members in the left-right direction is smaller than a sum of a width of a rear end portion of the seat cushion movable portion in the left-right direction and a width of a rear end portion of the seat cushion fixed portion in the left-right direction, and the seat cushion movable portion is configured to selectively adopt a normal state in which the seat cushion movable portion forms a seating surface of the seat cushion together with the seat cushion fixed portion, and a tip-up state in which the seat cushion movable portion is tipped up without interfering with the seat cushion fixed portion.

DESCRIPTION OF EMBODIMENTS

FIGS. 1 to 8 show an embodiment of the present disclosure. The present embodiment is an example in which the present disclosure is applied to an automobile seat 1. In each figure, arrows indicate directions of an automobile and the automobile seat 1 when the automobile seat 1 is attached to a floor F of the automobile. In the following description, description relating to directions uses these directions as a reference. Here, the automobile seat 1 and the floor F respectively correspond to the "vehicle seat" and the "vehicle floor" in claims.

Figure 1:
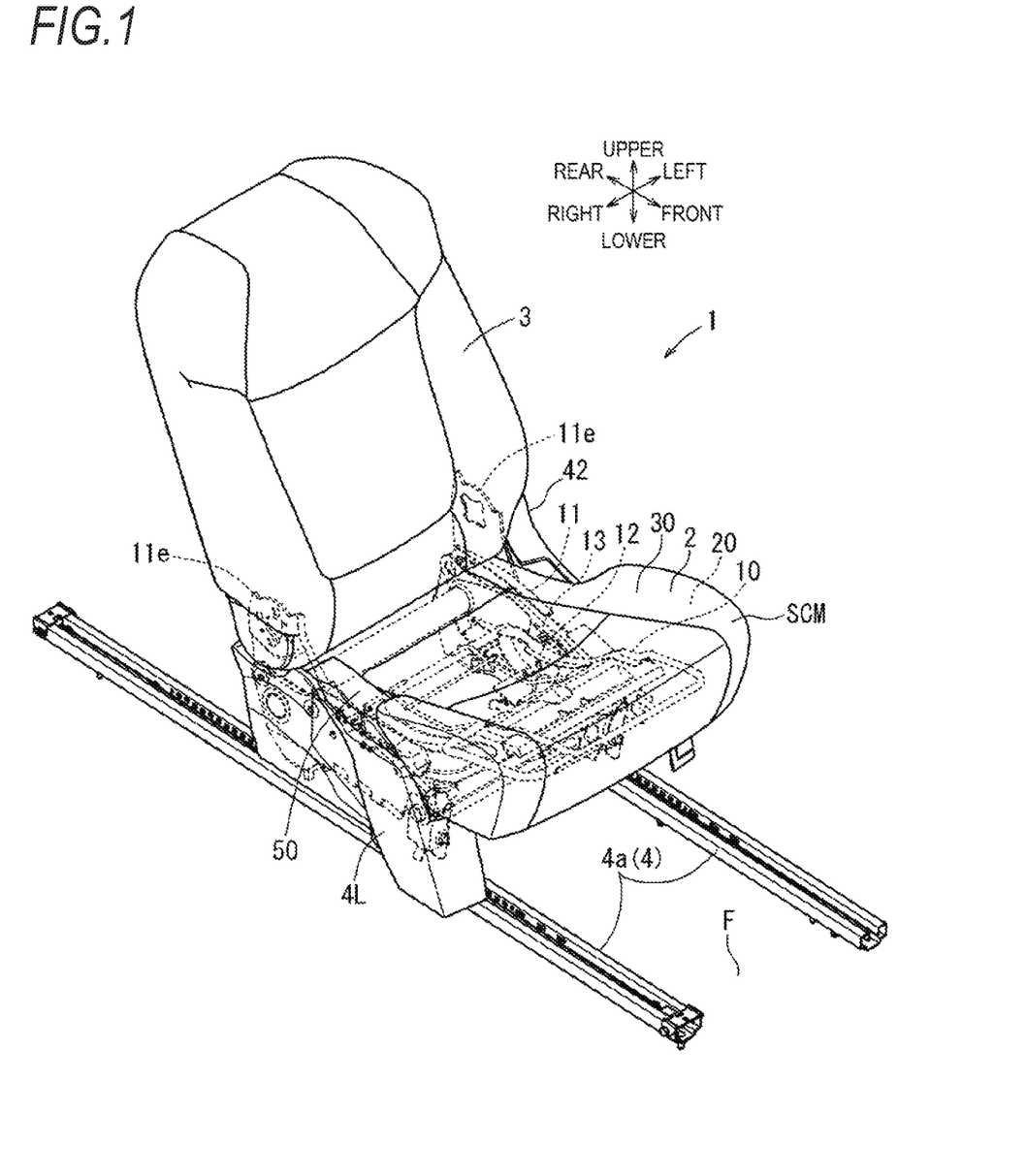
FIG. 1 is a perspective view of an automobile seat according to an embodiment of the present disclosure.

As shown in FIG. 1, the automobile seat 1 is a rear right seat, which includes a seat cushion 2 serving as a seating portion of a seated occupant, and a seat back 3 serving as a backrest. In a normal state in which the occupant is seated, lower end portions on left and right sides of the seat back 3 are respectively connected to rear end portions on left and right sides of the seat cushion 2 via a recliner (not shown) that functions as a rotation shaft device capable of stopping rotation.

Figure 3:
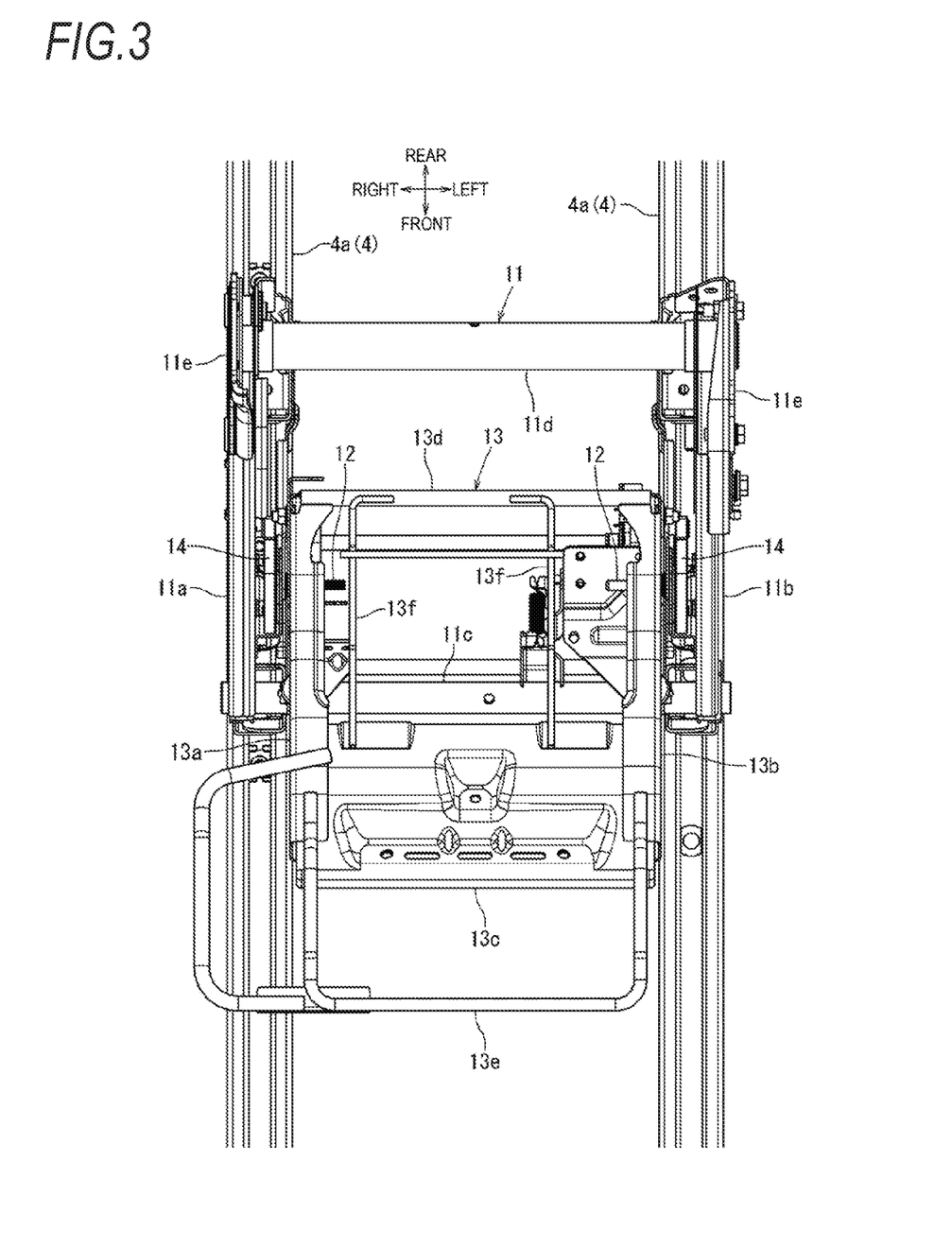
FIG. 3 is a plan view of a cushion frame of the above embodiment and a bracket for fixing a shield is omitted.

As shown in FIGS. 1 and 3, the seat cushion 2 includes: a cushion frame 10; a cushion pad 20 which is a cushion material; a cushion cover 30 which is a skin material; and a cushion fixed member 50 fixed to the cushion frame 10. The cushion frame 10 includes a base frame 11 formed in a rectangular frame shape when viewed from above, and a movable frame 13 which is attached in a manner capable of rotating around a tip-up shaft 12 extending in a left-right direction with respect to the base frame 11 and formed in a rectangular frame shape when viewed from above. Here, the tip-up shaft 12 corresponds to the "rotation shaft" in claims.

Figure 4:
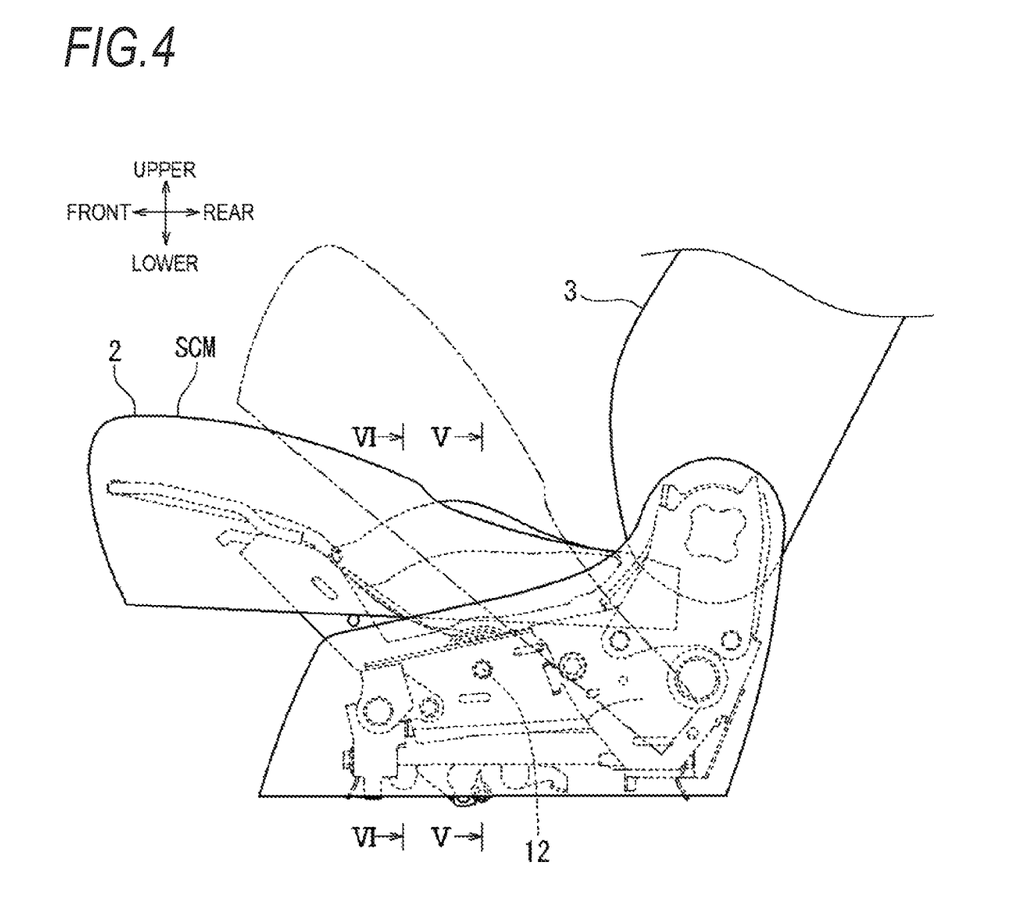
FIG. 4 is a side view of the automobile seat of the above embodiment.
Figure 5:
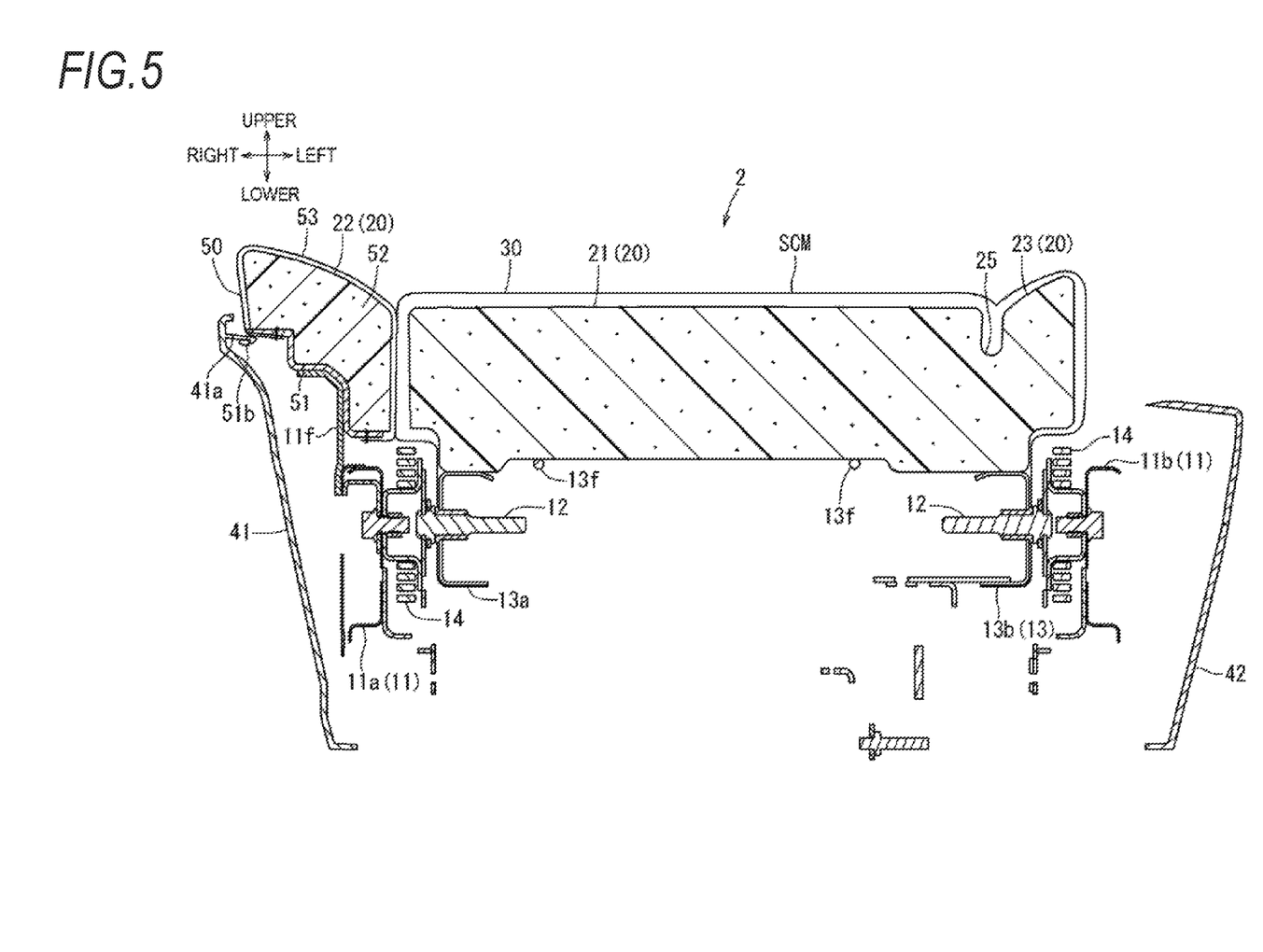
FIG. 5 is a cross-sectional view taken along Line V-V of FIG. 4.
Figure 6:
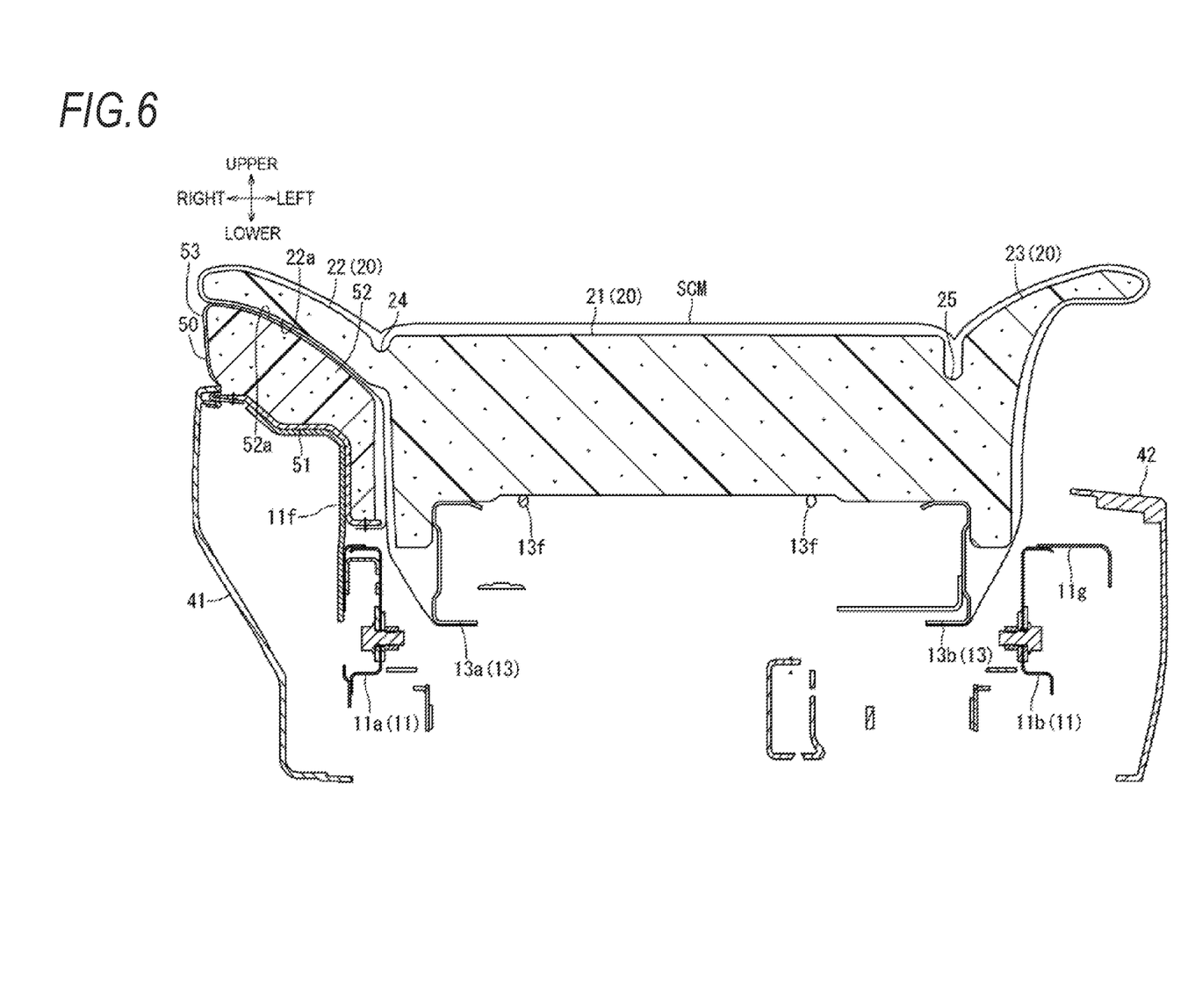
FIG. 6 is a cross-sectional view taken along Line VI-VI of FIG. 4.

As shown in FIGS. 2 to 6, in the base frame 11, front end portions of a right side frame 11a and a left side frame 11b extending in a front-rear direction are connected by a front pipe 11c, while rear end portions thereof are connected by a rear pipe 11d. As shown in FIGS. 5 and 6, the right side frame 11a is formed in a substantially U shape whose cross section is opened rightward, and the left side frame 11b is formed in a substantially U shape whose cross section is opened leftward. Lower end portion sides of the right side frame 11a and the left side frame 11b are attached to a slide rail 4 extending in the front-rear direction in a manner that allows motion in the front-rear direction. Specifically, the slide rail 4 includes a lower rail 4a fixed to the floor F side, and an upper rail (not shown) that is assembled in a manner that allows sliding in a longitudinal direction of the lower rail 4a. The lower end portion sides of the right side frame 11a and the left side frame 11b are attached to the upper rail. Upper portions of the rear end portion sides of the right side frame 11a and the left side frame 11b are each attached to reclining plates 11e. The seat back 3 is attached to each reclining plate 11e via the recliner (not shown). As shown in FIGS. 3 to 5, the tip-up shaft 12 that rotatably supports the movable frame 13 extends in the left-right direction on a front side of front-rear direction central portions of the right side frame 11a and the left side frame 11b. A right bracket 11f that attaches the cushion fixed member 50, which will be described below, is attached to an upper end portion side of the right side frame 11a. A right shield 41, which will be described below, is attached to a right side of the right side frame 11a. A left bracket 11g that attaches a left shield 42, which will be described below, is attached to a front portion of an upper end portion side of the left side frame 11b. An anchor bracket 11h that attaches an anchor of a seat belt (not shown) for restraining a body of the seated occupant is disposed on the rear end portion side of the left side frame 11b (see FIG. 2). Here, the right side frame 11a and the left side frame 11b correspond to "the pair of the left and right base members" in claims.

As shown in FIGS. 2 to 6, in the movable frame 13, front end portions of a right frame 13a and a left frame 13b, which extend in the front-rear direction and are curved convexly downward, are connected by a front panel 13c, while rear end portions thereof are connected by a rear pipe 13d. As shown in FIGS. 5 and 6, the right frame 13a is formed in a substantially U shape whose cross section is opened leftward, and the left frame 13b is formed in a substantially U shape whose cross section is opened rightward. A front support pipe 13e formed by bending a pipe material that contacts and supports a lower surface of a front portion of the cushion pad 20 is disposed at front portions of upper end portion sides of the right frame 13a and the left frame 13b. Two support wires 13f extending in the front-rear direction are disposed between the front panel 13c and the rear pipe 13d so as to contact and support a lower surface of a central portion of the cushion pad 20. The rear end portion sides of the right frame 13a and the left frame 13b are supported by the tip-up shaft 12 in a manner capable of rotating with respect to the base frame 11. Spiral springs 14 are disposed between the base frame 11 and the movable frame 13 around the left and right tip-up shafts 12. In FIG. 4, the spiral spring 14 urges the movable frame 13 in a clockwise direction around the tip-up shaft 12 with respect to the base frame 11. As a result, by rotating the movable frame 13 counterclockwise against a rotation urging force of the spiral spring 14 around the tip-up shaft 12 with respect to the base frame 11, the movable frame 13 is prevented from rotating by a lock mechanism (not shown) when the movable frame 13 becomes a normal state in which the occupant can be seated. When the lock mechanism becomes an unlocked state, the movable frame 13 becomes a tip-up state, shown by two-dot chain lines, due to the rotation urging force of the spiral spring 14. That is, the movable frame 13 is attached to the base frame 11 in a manner capable of selectively adopting the normal state and the tip-up state.

Figure 2:
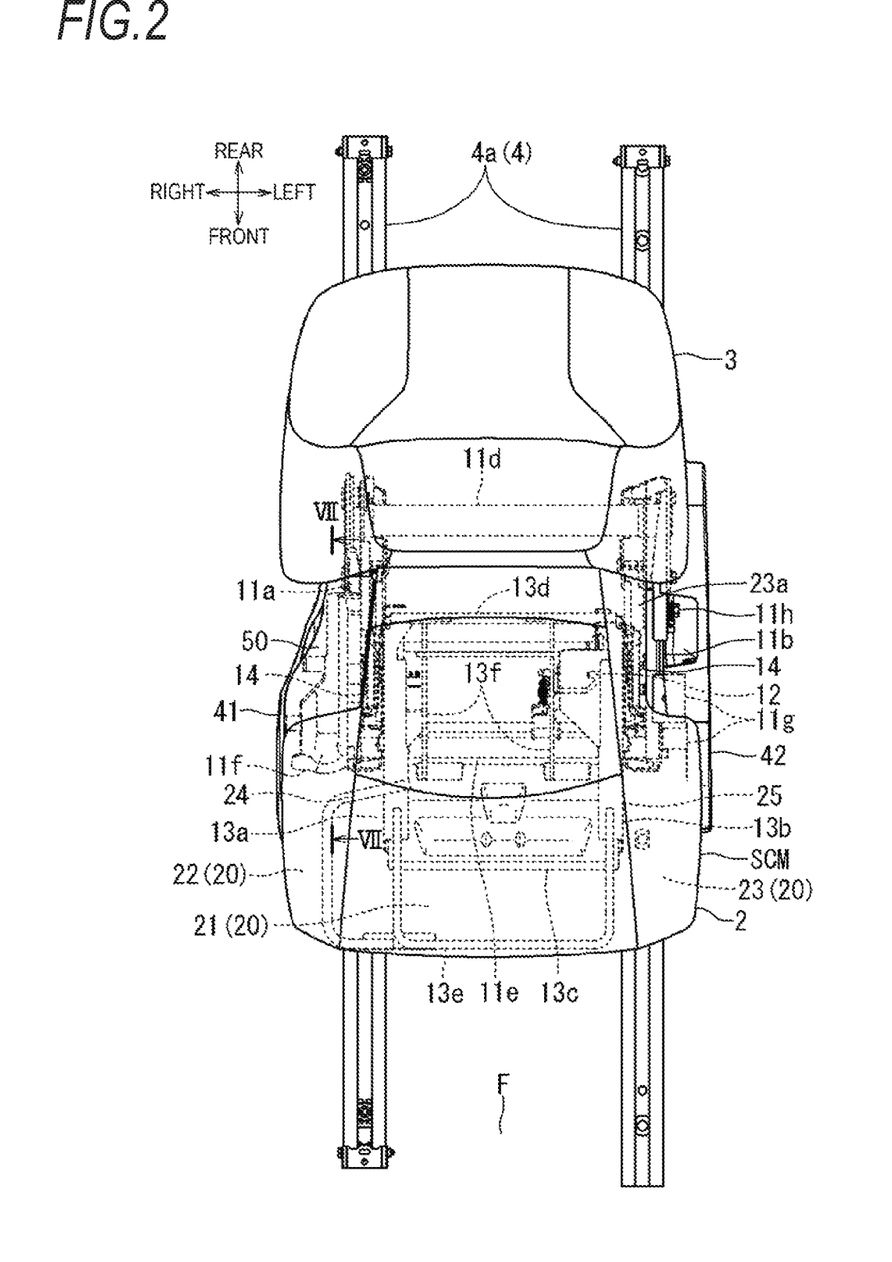
FIG. 2 is a plan view of the automobile seat of the above embodiment.

As shown in FIG. 2 and FIGS. 4 to 6, the cushion pad 20 is formed of urethane foam obtained by foaming polyurethane resin. A density of the urethane foam is, for example, substantially 0.035±0.005 g/cm$^3$. As shown in FIG. 2, the cushion pad 20 includes: a main portion 21 that contacts and supports lower surfaces of buttocks and thighs of the seated occupant; a right side portion 22 that contacts and supports a right side surface of a right thigh of the seated occupant, and a left side portion 23 that contacts and supports left side surfaces of the buttocks and a left thigh of the seated occupant. The right side portion 22 and the left side portion 23 protrude upward from the main portion 21. A right groove 24 extending substantially in the front-rear direction is formed between the main portion 21 and the right side portion 22 in a substantially U shape that is opened upward. A left groove 25 extending substantially in the front-rear direction is formed between the main portion 21 and the left side portion 23 in a substantially U shape that is opened upward.

Figure 7:
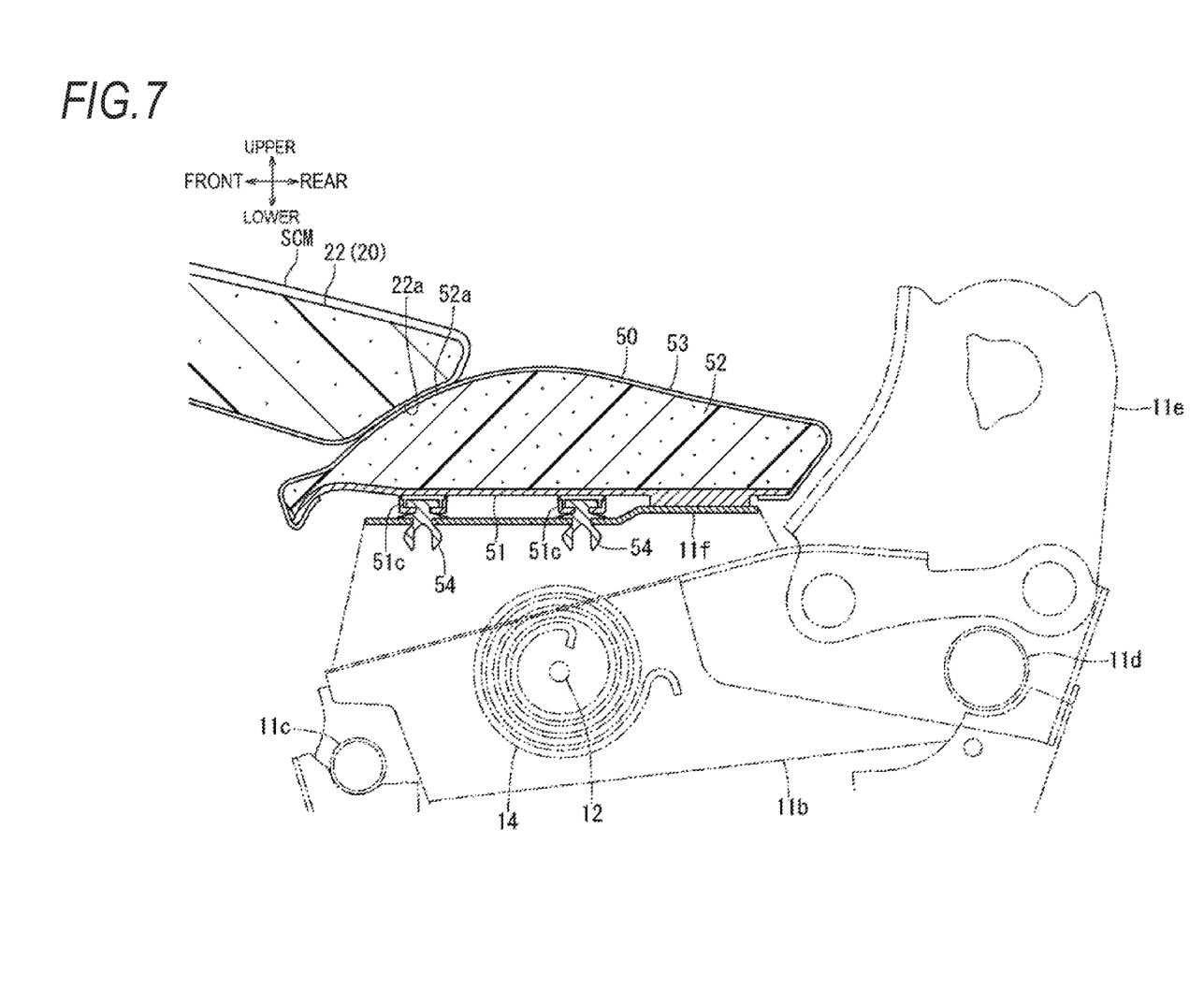
FIG. 7 is a cross-sectional view taken along Line VII-VII of FIG. 2.
Figure 8:
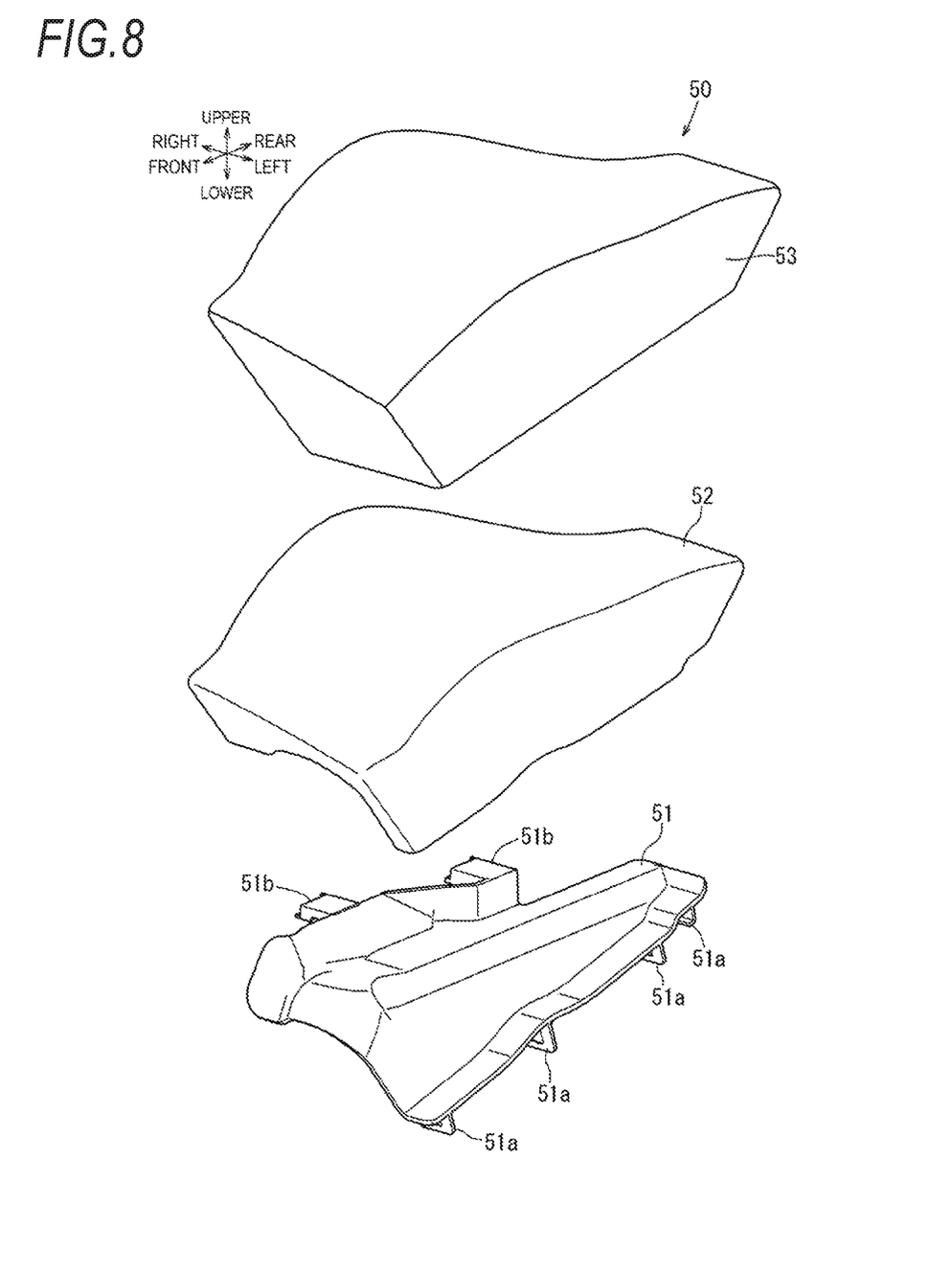
FIG. 8 is an exploded perspective view of a cushion fixed member of the above embodiment.

As shown in FIG. 2 and FIGS. 5 to 7, the right side portion 22 has a shape whose rear portion behind a rear side of a central portion in the front-rear direction is removed (slightly in front of the tip-up shaft 12 when mounted on the cushion frame 10). If this portion is not removed, this portion will interfere with the right side frame 11a when the movable frame 13 is in the tip-up state. As shown in FIGS. 6 and 7, a rear end portion lower surface 22a of the right side portion 22 is formed in a shape that forms a part of an arc centered on the tip-up shaft 12 in a side view when the cushion pad 20 is mounted on the movable frame 13 in the normal state. This arrangement is intended to allow the cushion pad 20 to slide smoothly with respect to the cushion fixed member 50, which will be described below, in a process of entering the tip-up state in which the movable frame 13 is tipped up. Here, the rear end portion lower surface 22a in the side view corresponds to the "boundary line" in claims.

As shown in FIG. 2 and FIGS. 5 and 6, the left side portion 23 has a shape whose rear portion behind a rear side of a central portion in the front-rear direction is removed (slightly in front of the tip-up shaft 12 when mounted on the cushion frame 10). That is, a width of the rear portion of the left side portion 23 in the left-right direction, which is behind the rear side of the central portion in the front-rear direction, is substantially ½ of a width of a front portion of the left side portion 23 in the left-right direction, which is in front of the rear side of the central portion in the front-rear direction. A left side of a narrow width portion 23a, which is a narrowed portion formed according to the above arrangement, corresponds to a position where the anchor bracket 11h is disposed, so that the left side portion 23 does not interfere with the left side frame 11b in the process of entering the tip-up state in which the movable frame 13 is tipped up. Although the rear portion of the left side portion 23 serves as the narrow width portion 23a, the left side surfaces of the buttocks of the seated occupant can still be supported since the anchor of the seat belt is attached to the anchor bracket 11h.

As shown in FIGS. 5 to 7, the cushion pad 20 is covered by the cushion cover 30 and mounted on the movable frame 13. The cushion cover 30 is formed into a three-dimensional shape by sewing and integrating a plurality of pieces of fabric skin materials laminated with thin slab urethane pads on back sides of the fabric. A terminal portion of the cushion cover 30 is attached to the movable frame 13 by means such as hog ring to form the seat cushion movable portion SCM.

As shown in FIGS. 4 to 8, the cushion fixed member 50 includes: a resin base plate portion 51, a cushion body 52 mounted on the base plate portion 51, which serves as a cushion material; and a cover material 53 covering a surface of the cushion body 52, which serves as a skin material. The base plate portion 51 is formed in a substantially stair shape in which a right end portion side is high while a left end portion side is low. On a lower surface of the left end portion side of the base plate portion 51, a plurality of upright plate portions 51*a* extending downward, which are parallel to each other, are disposed at predetermined intervals in the front-rear direction. Two engaged portions 51*b* extending rightward are formed on a lower surface of the right end portion side of the base plate portion 51, which are respectively engaged with engaging pieces 41*a* of the right shield 41. A lower end portion of each upright plate portion 51*a* of the base plate portion 51 contacts an upper surface portion of the right bracket 11*f*. Two parts of a central portion of the base plate portion 51 in the left-right direction are fixed to the right bracket 11*f* by clips 54. The engaging pieces 41*a* of the right shield 41 is, respectively, engaged with engaged portions 51*b* of the base plate portion 51, so that the right end portion side of the base plate portion 51 is supported by the right side frame 11*a* via the right shield 41.

Similarly to the cushion pad 20, the cushion body 52 is formed of urethane foam obtained by foaming polyurethane resin. A density of the urethane foam is, for example, substantially $0.035 \pm 0.005$ g/cm$^3$. A lower surface shape of the cushion body 52 corresponds to an upper surface shape of the base plate portion 51. An upper surface shape of the cushion body 52 corresponds to a seating surface of the seat cushion 2 continuous with the right side portion 22 of the cushion pad 20. As shown in FIGS. 6 and 7, a front end portion upper surface 52*a* of the cushion body 52 is formed in a shape that forms a part of the arc centered on the tip-up shaft 12 in a side view. This arrangement is intended to allow the cushion pad 20 to slide smoothly with respect to the cushion fixed member 50 in the process of entering the tip-up state in which the movable frame 13 is tipped up. In the cushion body 52, the cushion fixed member 50 is covered by the cover material 53 which is formed into a three-dimensional shape by sewing and integrating a plurality of pieces of fabric skin materials laminated with thin slab urethane pads on back sides of the fabric, similarly to the cushion cover 30. Specifically, the cushion body 52 is mounted on the base plate portion 51 and covered by the cover material 53. A terminal portion of the cover material 53 is fixed to the base plate portion 51 by means such as tucker to form the cushion fixed member 50. The cushion fixed member 50 is mounted and fixed on the right bracket 11*f*. Here, the cushion fixed member 50 corresponds to the "seat cushion fixed portion" in claims. The front end portion upper surface 52*a* in the side view corresponds to the "boundary line" in claims.

As shown in FIG. 2, the seat cushion 2 is formed by attaching the cushion fixed member 50, the seat cushion movable portion SCM, the right shield 41 and the left shield 42 to the base frame 11. As shown in FIG. 5, the right shield 41 is fixed to the right side frame 11*a* by a clip or a screw (not shown), and the engaging piece 41*a* is engaged with the engaged portion 51*b* of the cushion fixed member 50. The left shield 42 is fixed to the left bracket 11*g* of the left side frame 11*b* by a clip or a screw (not shown). Accordingly, as shown in FIG. 4, the seat cushion movable unit SCM is configured to selectively adopt the normal state indicated by the solid lines around the tip-up shaft 12 and the tip-up state indicated by the two-dot chain lines. Here, in the normal state of the seat cushion movable portion SCM, a sum of a width of a rear end portion of the seat cushion movable portion SCM and a width of the cushion fixed member 50 in the left-right direction corresponds to the "sum of a width of a rear end portion of the seat cushion movable portion in the left-right direction and a width of a rear end portion of the seat cushion fixed portion in the left-right direction" in claims. Also, the right shield 41 corresponds to the "cover member" in claims.

The present embodiment configured as described above has the following advantageous effects. In the seat cushion 2, the cushion fixed member 50 is fixed in a manner that the right side frame 11*a*, which is located behind the tip-up shaft 12 of the right side frame 11*a*, is partially overlapped with the seat cushion fixed member 50 when viewed from above. The seat cushion movable portion SCM is rotatable around the tip-up shaft 12, and is configured to selectively adopt the normal state in which the seat cushion movable portion SCM forms the seating surface of the seat cushion 2 together with the cushion fixed member 50, and the tip-up state in which the seat cushion movable portion SCM is tipped up without interfering with the cushion fixed member 50. Accordingly, even if the distance between the right side frame 11*a* and the left side frame 11*b* in the left-right direction is smaller than the sum of the width of the rear end portion of the seat cushion movable portion SCM and the width of the rear end portion of the cushion fixed member 50 in the left-right direction, the seat cushion movable portion SCM is configured to be tipped up without interfering with the right side frame 11*a* and the left side frame 11*b*.

The seat cushion 2 includes the right shield 41 attached to the side portion, in the left-right direction, of the right side frame 11*a*. The cushion fixed member 50 includes the base plate portion 51 supported by the right bracket 11*f*, and the cushion body 52 mounted on the base plate portion 51. The engaged portion 51*b* of the base plate portion 51 is engaged and attached with the engaging piece 41*a* of the right shield 41. Accordingly, since the base plate portion 51 is supported by the right bracket 11*f* and the right shield 41, the cushion fixed member 50 is stably attached to the base frame 11.

As shown in FIG. 7, the front end portion upper surface 52*a* and the rear end portion lower surface 22*a*, which are boundary lines, in a side view, between the cushion fixed member 50 and the seat cushion movable portion SCM in the normal state, are formed in an arc shape around the tip-up shaft 12. Accordingly, interference with the cushion fixed member 50 at the time of the tip-up of the seat cushion movable portion SCM can be prevented and thus the seat cushion movable portion SCM can be tipped up smoothly.

Also, the width of the rear end portion of the seat cushion movable portion SCM in the left-right direction is smaller than the distance between the right side frame 11*a* and the left side frame 11*b* in the left-right direction.

Also, a rear portion of the seat cushion movable portion SCM, which includes the rear end portion of the seat cushion movable portion SCM, is recessed in the left-right direction.

While certain embodiments have been described, the disclosure is not limited to these configurations, and various modifications, additions, and deletions may be made without departing from the scope of the patent. Examples thereof include the following.

In the above embodiment, the left side portion 23 of the cushion pad 20 has the shape whose rear portion behind the rear side of the central portion in the front-rear direction is removed (slightly in front of the tip-up shaft 12 when mounted on the cushion frame 10). Accordingly, the left side portion 23 does not interfere with the left side frame 11b in the process of entering the tip-up state in which the seat cushion movable portion SCM is tipped up. However, the present disclosure is not limited thereto. The rear portion of the left side portion 23 behind the rear side of the central portion in the front-rear direction may be removed in the same manner as the right side portion 22, and a fixed member similar to the cushion fixed member 50 may be provided in this portion. In this case, the left and right fixed members may be separated from each other or may be integrated with each other.

2. In the above embodiment, the front end portion upper surface 52a and the rear end portion lower surface 22a are formed in the arc shape around the tip-up shaft 12. However, the present disclosure is not limited thereto. Shapes of the front end portion upper surface 52a and/or the rear end portion lower surface 22a can be appropriately selected from a straight line to an arc as long as the sliding of the cushion fixed member 50 and the seat cushion movable portion SCM is not interfered during the tip-up.

3. In the above embodiment, the cushion fixed member 50 is formed by mounting the cushion body 52 on the base plate portion 51 and covering the cushion body 52 with the cover material 53. However, the present disclosure is not limited thereto. The cover material 53 and the base plate portion 51 can be disposed in a mold to form the cushion body 52 by foaming. That is, the cushion fixed member 50 can be an integrally foam-molded body. Similarly, the seat cushion movable portion SCM can also be an integrally foam-molded body.

4. Although in the above embodiment the present disclosure is applied to the automobile seat 1, the present disclosure is not limited thereto, and the present disclosure may be applied to a seat mounted on a ship, a train, an airplane, or the like other than an automobile.

What is claimed is:

1. A vehicle seat comprising:
   a seat cushion including:
      a pair of left and right base members extending in a seat front-rear direction and supported by a vehicle floor;
      a seat cushion movable portion which is attached in a manner that enables tip-up of the seat cushion around a rotation shaft, the rotation shaft being disposed between the pair of the left and right base members and extending in a left-right direction; and
      a seat cushion fixed portion which is fixed in a manner that an upper surface portion of at least one of the pair of the left and right base members, which is located behind the rotation shaft, is partially overlapped with the seat cushion fixed portion when viewed from above,
   wherein a distance between the pair of the left and right base members in the left-right direction is smaller than a sum of a width of a rear end portion of the seat cushion movable portion in the left-right direction and a width of a rear end portion of the seat cushion fixed portion in the left-right direction, and
   wherein the seat cushion movable portion is configured to selectively adopt a normal state in which the seat cushion movable portion forms a seating surface of the seat cushion together with the seat cushion fixed portion, and a tip-up state in which the seat cushion movable portion is tipped up without interfering with the seat cushion fixed portion.

2. The vehicle seat according to claim 1,
   wherein the seat cushion includes a cover member attached to a side portion, in the left-right direction, of the at least one of the pair of the left and right base members,
   wherein the seat cushion fixed portion includes a base plate portion supported by the at least one of the pair of the left and right base members and a cushion body mounted on the base plate portion, and
   wherein a part of the base plate portion is engaged with the cover member.

3. The vehicle seat according to claim 1,
   wherein a boundary line, viewed in a side view, between the seat cushion fixed portion and the seat cushion movable portion in the normal state is formed in a substantially arc shape around the rotation shaft.

4. The vehicle seat according to claim 1,
   wherein the width of the rear end portion of the seat cushion movable portion in the left-right direction is smaller than the distance between the pair of the left and right base members in the left-right direction.

5. The vehicle seat according to claim 1,
   wherein a rear portion of the seat cushion movable portion, which includes the rear end portion of the seat cushion movable portion, is recessed in the left-right direction.

6. The vehicle seat according to claim 1,
   wherein a width of a front end portion of the seat cushion movable portion in the left-right direction is larger than a width of the rear end portion of the seat cushion movable portion in the left-right direction.

7. The vehicle seat according to claim 1,
   wherein the rear end portion of the seat cushion fixed portion in the left-right direction is disposed adjacent to an outer side of the rear end portion of the seat cushion movable portion in the left-right direction.

8. The vehicle seat according to claim 1,
   wherein a front end portion of the seat cushion movable portion overlaps a front end portion of the seat cushion fixed portion when viewed from above, and the rear end portion of the seat cushion fixed portion is exposed so as to define a part of the seating surface of the seat cushion.

9. The vehicle seat according to claim 1,
   wherein a width of a front end portion of the seat cushion movable portion in the left-right direction is larger than a width of a front end portion of the seat cushion fixed portion in the left-right direction.

\* \* \* \* \*